United States Patent
Jokela et al.

(10) Patent No.: US 11,634,645 B2
(45) Date of Patent: Apr. 25, 2023

(54) CONTROLLING HYDROTHERMAL LIQUEFACTION

(71) Applicant: UPM-KYMMENE CORPORATION, Helsinki (FI)

(72) Inventors: Pekka Jokela, Espoo (FI); Andrea Gutierrez, Espoo (FI); Teemu Lindberg, Espoo (FI); Bert Heesink, Enschede (NL); Sascha Kersten, Delden (NL); Roel Westerhof, Enschede (NL)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 17/350,487

(22) Filed: Jun. 17, 2021

(65) Prior Publication Data

US 2021/0403812 A1 Dec. 30, 2021

(30) Foreign Application Priority Data

Jun. 26, 2020 (FI) .................................... 20205680

(51) Int. Cl.
| C10G 1/06 | (2006.01) |
| C10G 1/00 | (2006.01) |
| C10G 1/02 | (2006.01) |
| C10G 3/00 | (2006.01) |
| C10G 51/02 | (2006.01) |

(52) U.S. Cl.
CPC ............... *C10G 1/008* (2013.01); *C10G 1/02* (2013.01); *C10G 1/06* (2013.01); *C10G 3/40* (2013.01); *C10G 51/023* (2013.01); *C10G 2300/1014* (2013.01); *C10G 2300/4006* (2013.01); *C10G 2300/4012* (2013.01); *C10G 2300/4081* (2013.01)

(58) Field of Classification Search
CPC ........ C10G 1/06; C10G 1/008; C10G 51/023; C10G 2300/1014
See application file for complete search history.

(56) References Cited

U.S. PATENT DOCUMENTS

| 4,935,567 A | * | 6/1990 | Yokoyama | ............... | C10G 1/04 585/638 |
| 2008/0032344 A1 | * | 2/2008 | Fallavollita | ............... | C12P 7/10 435/72 |
| 2011/0209387 A1 | | 9/2011 | Humphreys | | |
| 2017/0073586 A1 | * | 3/2017 | Iversen | ................. | C10G 1/008 |
| 2017/0362618 A1 | | 12/2017 | Nguyen | | |
| 2018/0305502 A1 | | 10/2018 | Miettinen | | |

FOREIGN PATENT DOCUMENTS

| EP | 2718404 B1 | 1/2021 |
| WO | 2017219151 A1 | 12/2017 |

OTHER PUBLICATIONS

Motoyuki Sugano et al., "Hydrothermal liquefaction of plantation biomass with two kinds of wastewater form paper industry", Journal of Mater Sci., vol. 43, 2008; pp. 2476-2486.

Xue, Y. et al., "A review on the operating conditions of producing bio-oil from hydrothermal liquefaction of biomass", International Journal of Energy Research, vol. 40, 2016; pp. 865-877.

Jensen et al., "Fundamentals of Hydrofaction: Renewable crude oil from woody biomass", Viomass Conv. Bioref., vol. 7, 2017; pp. 495-509.

Yang et al.," Improvements of Bio-crude Oil Yield and Phosphorus Content by Hydrothermal Liquefaction Using Microalgae", Chemical Engineering Technology, vol. 40, No. 12, 2017; pp. 2188-2196.

Yin et al., "Hydrothermal liquefaction of cellulose to bio-oil under acidic, neutral and alkaline conditions", Applied Energy, vol. 92, 2012; pp. 234-239.

\* cited by examiner

*Primary Examiner* — Randy Boyer
(74) *Attorney, Agent, or Firm* — Cantor Colburn LLP

(57) ABSTRACT

The present disclosure relates to a method for controlling product slate of hydrothermal liquefaction by adjusting pH of hydrothermal liquefaction product aqueous phase. The pH of the hydrothermal liquefaction product aqueous phase can be adjusted by heating during hydrothermal liquefaction (110) a mix (30) comprising lignocellulosic feedstock (10) together with acids, alkalis and/or buffers (20) added under aqueous conditions. The method typically comprises separating (120) aqueous phase (53) and oil phase (50), and optionally gas (51) and/or char (52), of the obtained hydrothermal liquefaction product (40). Preferably the separated aqueous phase (53) is recirculated to be mixed 100 with lignocellulosic feedstock (10).

25 Claims, 6 Drawing Sheets

CONTROLLING HYDROTHERMAL LIQUEFACTION

CROSS REFERENCE TO RELATED APPLICATION

This application claims benefit of Finnish Patent Application No. 20205680 filed on Jun. 26, 2020, the contents of which is incorporated by reference herein in its entirety.

FIELD OF THE DISCLOSURE

The present disclosure relates to a method for controlling product slate of hydrothermal liquefaction by adjusting pH of hydrothermal liquefaction product aqueous phase. The pH of the hydrothermal liquefaction product aqueous phase can be controlled by adding adjusted amounts of acids, alkalis and/or buffers to a mix comprising lignocellulosic feedstock, before subjecting the mix to the heating of hydrothermal liquefaction.

BACKGROUND OF THE DISCLOSURE

Biomass is increasingly recognized as a valuable feedstock to be used as an alternative to petroleum for the production of biofuels and chemicals.

Renewable energy sources represent the potential fuel alternatives to overcome the global energy crises in a sustainable and eco-friendly manner. In future, biofuels may replenish the conventional non-renewable energy resources due to their renewability and several other advantages.

Biofuels are typically manufactured from feedstock originating from renewable sources, including oils and fats obtained from plants, animals, algal materials and fish. Lignocellulosic biomass, which refers to plant biomass that is composed of cellulose, hemicellulose, and lignin, offers a highly renewable biomass to generate biofuels. Biofuels originating from lignocellulosic biomass can replace fossil fuels from an energy point of view.

Converting biomass into renewable fuels and chemicals usually involves thermal treatment of the biomass and a promising technology is Hydrothermal Liquefaction (HTL). HTL is carried out with liquid water usually containing an adjustable amount of alkaline salts.

Despite the ongoing research and development in the processing of feedstocks and manufacture of fuels, there is still a need to provide an improved method for controlling products obtained by hydrothermal liquefaction. Especially when converting biomass, particularly lignocellulosic biomass, to valuable chemicals, such as hydrocarbons suitable as fuels or fuel blending components.

BRIEF DESCRIPTION OF THE DISCLOSURE

An object of the present disclosure is to provide a method for controlling product slate of hydrothermal liquefaction by measuring and adjusting pH of hydrothermal liquefaction product aqueous phase. Typically, the feedstock is lignocellulosic feedstock. In some embodiments of the disclosure, the method comprises adjusting acidity of a mix comprising lignocellulosic feedstock by adding acids, alkalis and/or buffers under aqueous conditions and subjecting the mix comprising lignocellulosic feedstock to hydrothermal liquefaction.

The disclosure is based on the idea of a desire to identify an operation parameter to control and steer the hydrothermal liquefaction process for example to ensure that the production of yield of char is minimized and the oil yield is maximized. It has now been noticed that pH of the hydrothermal liquefaction product aqueous phase can be used as a parameter for this purpose. Measuring the pH of the hydrothermal liquefaction product aqueous phase is more convenient for controlling acidity of the reaction media than measuring pH during hydrothermal liquefaction reaction conditions. The pH of the aqueous phase can be controlled by adding adjusted amounts of acids, alkalis and/or buffers, to a mix comprising lignocellulosic feedstock before exposing the mix to the heating of the hydrothermal liquefaction. Typically, the mix comprising lignocellulosic feedstock comprises recirculated hydrothermal liquefaction product aqueous phase and/or alkaline aqueous solution, such as black liquor, an aqueous solution of alkaline salts and/or a mixture thereof.

A further advantage of some embodiments of the method of the disclosure is that recycling of the hydrothermal liquefaction product aqueous phase, separated after the hydrothermal liquefication, decreases the amount of fresh water needed and also decreases the amount of new salts and/or black liquor needed in the process, major part of the salts in the hydrothermal liquefaction product aqueous phase can be recirculated. Further, the oil yield increases by the recirculation of the aqueous phase, still maintaining the oil product quality. Moreover, the char yield is lowered.

A further advantage is achieved when black liquor and recirculated aqueous phase comprising salts originating from black liquor is added to the mix comprising lignocellulosic feedstock.

Separating the aqueous phase comprising all or part of the salts from the hydrothermal liquefaction product oil phase, also leads to a less corrosive environment if the oil phase is subjected to a second thermal conversion stage. Thus, high investment costs for equipment can be avoided. Further, the use of a second thermal conversion stage allows the use of lower temperatures and milder conditions during the hydrothermal liquefication.

At conditions below those of supercritical water, salts remain dissolved in the aqueous phase, thus precipitation and deposit of the salts can be avoided.

A further advantage of the method is that measuring the acidity of the aqueous phase of the hydrothermal liquefaction product is easier than measuring the acidity of the oil phase.

The method of the disclosure is especially suitable when lignocellulosic biomass is converted to valuable chemicals, such as hydrocarbons suitable as fuels, fuel blending components or feedstock for fuel production.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

Figure 1:
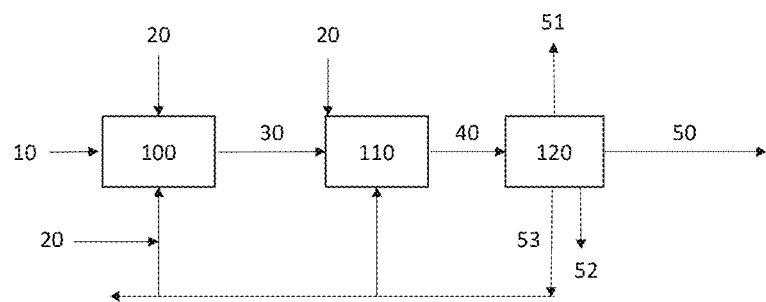
FIG. 1 is a schematic flow diagram representing one embodiment of the process.

In order to enable industrially effective and sustainable processes for recovering renewable products from lignocellulosic feedstock, which are particularly suitable as feedstock for hydroprocessing in biofuel manufacture, a method for controlling product slate of hydrothermal liquefaction is provided.

It was surprisingly noticed that a method for controlling product slate of hydrothermal liquefaction can be provided by measuring and adjusting pH of the hydrothermal liquefaction product aqueous phase.

According to some embodiments of the disclosure the method comprises adjusting acidity of a mix comprising lignocellulosic feedstock by adding acids, alkalis and/or buffers under aqueous conditions and subjecting the mix, comprising lignocellulosic feedstock together with the added acids, alkalis and/or buffers, to heating during hydrothermal liquefaction. Whether acids, alkalis and/or buffers should be used depends on the acidity of the lignocellulosic feedstock as well as on the other compounds added to the mix comprising the lignocellulosic feedstock.

In some embodiment according to the disclosure the lignocellulosic feedstock is mixed with acids, alkalis and/or buffers comprising or chosen from black liquor; black liquor and water; acid salts; alkaline salts; acidic solution; alkaline solution, alkaline aqueous solution, buffers, buffer solution; $CO_2$; recirculated hydrothermal liquefaction product aqueous phase; and/or a mixture of any of these, preferably black liquor; acid salts chosen from one or more of acetic acid and propanoic acid; alkaline salts chosen from one or more of NaOH, $K_2CO_3$, KOH and $Na_2CO_3$; recirculated hydrothermal liquefaction product aqueous phase; and/or a mixture of any of these. In some embodiment according to the disclosure this mix comprising lignocellulosic feedstock is pretreated before subjecting this mix comprising lignocellulosic feedstock to hydrothermal liquefaction. Typically, the recirculated hydrothermal liquefaction product aqueous phase comprises recycled salts originating from black liquor; and/or from recycled alkaline salts, preferably chosen from one or more of NaOH, $K_2CO_3$, KOH and $Na_2CO_3$. In preferred embodiments of the disclosure the mix comprising lignocellulosic feedstock comprises black liquor; alkaline salts, preferably alkaline salts chosen from one or more of NaOH, $K_2CO_3$, KOH and $Na_2CO_3$; water; recirculated hydrothermal liquefaction product aqueous phase comprising recycled salts originating from black liquor; or a mixture of any of these. According to some embodiments of the disclosure the lignocellulosic feedstock is mixed with an alkaline aqueous solution before hydrothermal liquefaction. The alkaline aqueous solution is preferably black liquor; black liquor and water; alkaline salts and water; or a mixture of any of these. The alkaline salts are preferably chosen from one or more of NaOH, $K_2CO_3$, KOH and $Na_2CO_3$.

According to some embodiments of the disclosure the pH of the hydrothermal liquefaction product aqueous phase can be adjusted by mixing lignocellulosic feedstock and acids, alkalis and/or buffers under aqueous conditions before the heating during hydrothermal liquefaction. The method typically comprises separating aqueous phase and oil phase, and optionally gas and/or char, of the obtained hydrothermal liquefaction product and recirculating hydrothermal liquefaction product aqueous phase to the mix comprising lignocellulosic feedstock.

In the present specification and claims, the following terms have the meanings defined below.

The term "lignocellulosic feedstock" refers to lignocellulosic biomass from virgin and waste materials of plant origin that consists essentially of three natural polymers: cellulose, hemicellulose, and lignin. Lignocellulosic biomass material has an elemental composition typically rich in carbon and oxygen but relatively poor in hydrogen. Biomass comes in many different forms, which according to one definition may be grouped into four main categories: wood and wood residues, including sawmill and paper mill discards, municipal paper waste, agricultural residues, including corn stover (stalks and straw) and sugarcane bagasse, and dedicated energy crops. Examples of energy crops are for example tall, woody grasses such as switchgrass, *miscanthus* and energycane grass and grain or seed crops such as *Sorghum bicolor, Jatropha curcas* L. and *Arundo donax*, and seeds of the family Brassicaceae, for example *Brassica carinata* and *Camelina sativa*. The feedstock of the embodiments of the disclosure either comprises lignocellulose feedstock or consists of lignocellulosic feedstock.

The term "alkaline aqueous solution" is the alkalic solution added to the mix comprising lignocellulosic feedstock according to some embodiments of the disclosure. According to the disclosure the alkaline aqueous solution used is typically either raw-material or residues originating from pulp- and papermaking, such as black liquor obtained from the pulp Kraft process or alternatively the aqueous solution is water and salts. The salts are typically chosen from alkaline salts, preferably from one or more of NaOH, $K_2CO_3$, KOH and $Na_2CO_3$. When black liquor is used as alkaline aqueous solution it can be diluted with water if needed. The mix comprising lignocellulosic feedstock comprises an adjustable amount of salts. Recirculated hydrothermal liquefaction product aqueous phase which comprises recycled salts originating from black liquor or salts used as acid, alkali or buffer in the mix comprising lignocellulosic feedstock, can also be used in the mix comprising lignocellulosic feedstock, optionally new salts or black liquor is also added.

The term "black liquor" as used herein, refers to the aqueous liquid residue of the kraft pulping process which has been separated from solid wood pulp (cellulose fibres). The kraft pulping process is well-known. The process involves the conversion of wood to pulp using an aqueous mixture containing sodium hydroxide and sodium sulphide. These chemicals remove the lignin links between cellulose fibres, thereby releasing the fibres and producing water-soluble compounds. The production of black liquor is well-understood by the skilled person. Black liquor contains dissolved wood degradation products such as lignin and hemicellulose fragments, as well as methanol, sulfur compounds and dissolved inorganic solids such as spent pulping chemicals. The methanol content is typically in the range of 0.5-1.5 wt. % based on the mass of dry solids. Sulfur compounds are typically contained in the black liquor in an amount of 2-7 wt. % based on the mass of dry solids. The liquid separated from pulp and containing these compounds is commonly referred to as "crude black liquor" or "weak black liquor".

The term "crude oil" is the oil phase obtained after separation of at least an aqueous phase and an oil phase from the hydrothermal liquefaction product obtained from the hydrothermal liquefaction step of the process. In one embodiment of the disclosure the oil phase is treated further in a second thermal conversion treatment such as a thermal upgrading step. The crude oil may include all or some solids of the hydrothermal liquefaction product.

According to the embodiments of the disclosure, dry biomass, i.e. lignocellulosic feedstock to dry black liquor ratio is between 0.5 and 7, preferably between 0.5 and 6, more preferably between 0.5 to 2.5. The dry biomass is for example the dry ash free wood and the dry black liquor comprises the organics and salts of the black liquor.

According to embodiments of the disclosure the aqueous phase separated after the hydrothermal liquefaction step can be added to the mix comprising lignocellulosic feedstock; to a pretreatment step; and/or to the hydrothermal treatment step, i.e. it can be used in the mix comprising lignocellulosic feedstock or it can be recirculated back to the hydrothermal liquefaction step for example to minimize the amount of fresh water and new salts needed. Alternatively, or in addition to the recycled aqueous phase, more acids, alkalis and/or buffers, for example alkaline salts such as NaOH, $K_2CO_3$, KOH or $Na_2CO_3$ or black liquor, can be added to the mix comprising lignocellulosic feedstock; to a pretreatment step; to the hydrothermal treatment step; and/or to the recirculation stream.

Typically, in the embodiments of the disclosure, the method comprises measuring pH of the aqueous phase of the hydrothermal liquefaction product aqueous phase, especially when the hydrothermal liquefaction product aqueous phase is recirculated and mixed with lignocellulosic feedstock in the mix comprising lignocellulosic feedstock. In the embodiments of the disclosure the pH of the aqueous phase is kept at values of at least pH 3.5, preferably between pH 3.5 and pH 13, more preferably between pH 4 and pH 10, between 4.5 and pH 9 or between pH 4.5 and pH 8, most preferably between 4.5 and 6 or between 4.5 and 10, including the pH being between two of the following; pH 3.5, pH 4, pH 4.5, pH 5, pH 5.5, pH 6, pH 6.5, pH 7, pH 7.5, pH 8, pH 8.5, pH, 9, pH 9.5, pH 10, pH 11, pH 11.5, pH 12, pH 12.5, pH 13, pH 13.5 and pH 14.

By utilizing the method of the disclosure, hydrothermal liquefaction product slate is controlled. The hydrothermal liquefaction product is typically a mixture of gas, aqueous phase, oil phase and char and typically at least an aqueous phase and an oil phase are separated. The oil phase optionally contains solids, such as char comprised in the hydrothermal liquefaction product. Typically, pH of the hydrothermal liquefaction product aqueous phase is adjusted in order to control and maximise formation of oil phase (wt. %), of char (wt. %) or a combination thereof versus 100 wt. % hydrothermal liquefaction product.

Adjusting pH of the hydrothermal liquefaction product aqueous phase can typically be performed by adjusting the biomass concentration of the feed to the hydrothermal liquefaction; by adjusting the biomass to black liquor ratio; or by adjusting the amount of salts by adding black liquor or new alkaline salts to the mix comprising lignocellulosic feedstock. The biomass concentration can be adjusted for example by selecting flow rates of streams during process design stage. The biomass to black liquor ratio can be used for controlling pH when black liquor is not converted to oil during hydrothermal liquefaction. In preferred embodiments of the disclosure, the pH of the hydrothermal liquefaction product aqueous phase is adjusted by adjusting acidity of a mix comprising lignocellulosic feedstock by adding acids, alkalis and/or buffers under aqueous conditions before subjecting the mix comprising the lignocellulosic feedstock to hydrothermal liquefaction. This can be done for example by adding black liquor or new salts to the mix comprising the lignocellulosic feedstock, optionally together with recycled hydrothermal liquefaction product aqueous phase.

According to embodiments of the disclosure the method typically comprises a process comprising the following steps of (a) heating during hydrothermal liquefaction a mix comprising lignocellulosic feedstock and optionally one or more of acid, alkali and buffer, at a temperature between 290° C. and 450° C., under a pressure from 90 to 350 bar, to obtain a hydrothermal liquefaction product. The temperature of the hydrothermal liquefaction step is adjusted to a temperature selected from between 290° C. and 450° C., more preferably between 300° C. and 400° C., including the temperature being a temperature between two of the following temperatures; 290° C., 300° C., 305° C., 310° C., 315° C., 320° C., 325° C., 330° C., 340° C., 350° C., 360° C., 370° C., 380° C., 390° C., 400° C., 410° C., 420° C., 430° C., 440° C., and 450° C. for the heating of the mix comprising lignocellulosic feedstock at a pressure between 70 and 350 bar, preferably between 120 bar and 300 bar, including the pressure being between two of the following pressures; 70 bar, 80 bar, 90 bar, 95 bar, 100 bar, 105 bar, 110 bar, 115 bar, 120 bar, 130 bar, 140 bar, 150 bar, 160 bar, 180 bar, 200 bar, 220 bar, 240 bar, 260 bar, 280 bar, 300 bar, 320 bar, 330 bar, 340 bar and 350 bar. In a continuous process the pressure is preferably between 100 bar and 300 bar, more preferably between 120 and 250 bar. The hydrothermal liquefaction heating is followed by separating from the hydrothermal liquefaction product aqueous phase and oil phase, and optionally gas and/or char. Preferably, the process further comprises recirculating at least part of the hydrothermal liquefaction product aqueous phase to the mix comprising lignocellulosic feedstock; to a lignocellulosic feedstock pretreatment step; and/or to the hydrothermal treatment.

According to embodiments of the disclosure pretreating of the lignocellulosic feedstock may comprise treating the mix comprising lignocellulosic feedstock at a temperature between 180° C. and 245° C., under a pressure from 10 to 55 bar, for 10-180 min before hydrothermal liquefaction heating, if needed for example in order to obtain a pumpable mixture. The breakdown of the feedstock can be facilitated by mechanical treatment using different kind of mechanical equipment such as stirrer, pump etc. Preferably the temperature is adjusted to a temperature selected from between 200° C. and 220° C., including the temperature being a temperature between two of the following temperatures; 180° C., 190° C., 200° C., 205° C., 210° C., 215° C., 220° C., 225° C., 230° C., 240° C. and 245° C. and/or at a pressure from 10 to 55 bar, preferably 20 bar-30 bar for 10-180 minutes, preferably 50-70 minutes. At lower temperatures such as from 180° C. to 210° C. a longer time such as from 120 to 180 minutes is preferred and at higher temperatures such as 230 to 245° C. a shorter time such as 10 to 20 minutes is sufficient. A shorter time such as 10 to 60 minutes, preferably 10 to 20 minutes is also sufficient when mechanical treatment such as stirring is used during the treatment of the lignocellulosic feedstock.

The embodiments of the disclosure can further comprise another thermal conversion step, in addition to the hydrothermal liquefaction, preferably a thermal upgrading comprising heating the oil phase of the hydrothermal liquefaction product and a solvent at a temperature between 360° C. to 450° C., under a pressure from 50 to 120 bar. Preferably the solvent is crude tall oil, acid oil, vegetable oil or renewable hydrocarbons or mixtures thereof and/or preferably heating is performed at a temperature from 370° C. and 400° C., more preferably between 360° C. and 400° C., including the temperature being a temperature between two of the following temperatures; 360° C., 370° C., 375° C., 380° C., 385° C., 390° C., 395° C., 400° C., 410° C., 420° C., 430° C., 440° C. and 450° C. and/or preferably at a pressure from 90-110 bar, more preferably below 100 bar, including the pressure being between two of the following pressures; 50 bar, 60 bar, 70 bar, 80 bar, 90 bar, 95 bar, 100 bar, 105 bar, 110 bar and 120 bar. A further thermal conversion step is especially beneficial if the temperature of the hydrothermal liquefaction step is adjusted to a lower temperature selected from between 290° C. and 340° C., more preferably between 300° C. and 330° C., including the temperature being a temperature between two of the following temperatures; 290° C., 300° C., 305° C., 310° C., 315° C., 320° C., 325° C., 330° C. and 340° C. for the heating of the mix comprising lignocellulosic feedstock. Typically, the thermal upgrading is performed for 5-30 minutes, preferably 5-15 minutes.

The lignocellulosic feedstock is preferably selected from non-edible resources such as non-edible wastes and non-edible plant materials. A preferred lignocellulosic biomass material according to the disclosure comprises or is chosen from energy crops, for example Brassica carinata; waste or residues of the wood-processing industry such as slash, urban wood waste, lumber waste, wood chips, wood branches, bark, leaves, needles, tree tops, wood sawdust, straw, cutter shavings, firewood, plywood residual; residues of the pulp- and papermaking such as recycled paper, black liquor, brown liquor and sludges; and/or residues of timber processes. Typically, lignocellulosic biomass contains up to 50 wt. % of water. Typically, solid lignocellulosic feedstock as used in the disclosure, is broken down or split to a maximum size of less than 100 mm, preferably from 0.5 to 50 mm, more preferably from 0.5 to 30 mm, most preferably from 0.5 to 15 mm by grinding, chopping, cutting, crushing etc. Typical, preferred feedstock is energy crop and waste or residues of the wood-processing industry, more preferably seeds of the family Brassicaceae, for example Brassica carinata, wood chips, bark, especially bark in the size of wood chips and/or sawdust. A typical softwood chip used for chemical pulping is 25±3 mm long and 4 mm thick. In mechanical pulping, the chips are 20±2 mm long and 3 mm thick on average. Hardwood chips are 20±2 mm long and 3 mm thick on average. A typical bark size is 0.25 to 100 mm, preferably from 3 to 50 mm, more preferably from 16 to 45 mm. A typical sawdust is below 5 mm, preferably below 3.15 mm, more preferably below 2 mm, most preferably below 1 mm.

In FIG. 1 lignocellulosic biomass such as lignocellulosic feedstock 10 is mixed 100 with acids, alkalis and/or buffers 20 such as preselected salts or black liquor under aqueous conditions. The obtained mix 30 is then fed to a hydrothermal liquefaction step 110 where it is heated. The hydrothermal liquefaction product 40 obtained from the hydrothermal liquefaction step 110 is directed to a separation step 120 where aqueous phase 53, oil phase 50 and optionally gases 51 and char 52 are separated. Part of the aqueous phase 53 may optionally be recycled back to the hydrothermal liquefaction step 110 and/or to be mixed 100 with the lignocellulosic feedstock before the hydrothermal liquefaction step 110. The oil phase 50, optionally together with all or part of the char, can be directed to an optional thermal upgrading step (not shown in the figure) and/or to an optional fractionation step (not shown in the figure). Optionally all or part of the oil phase can be directed to hydroprocessing (not shown in the figure). Acids, alkalis and/or buffers 20 can optionally be added to the mixing 100 to provide a mix 30 comprising lignocellulosic feedstock 10; to an optional pretreatment step (not shown); to the hydrothermal treatment step 110; and/or to the recirculation stream of aqueous phase 53.

The embodiments of the disclosure can be carried out batch-wise or in continuously operated reactors. The reaction time, or the residence time in case of continuously operated reactors, of the hydrothermal liquefaction step is typically 3-60 minutes, preferably 5-40 minutes, most preferably 5-30 minutes.

According to an embodiment of the disclosure the hydrothermal liquefaction product oil phase and/or the product of the further thermal conversion treatment, or part of it, is directed to fractionation. Typically, a light fraction and a heavy fraction as well as optionally gases and bottom residue fraction are separated. Alternatively, the product of the further thermal conversion treatment may be used as such for example in marine fuel applications or applications relating to heating The fractionation may be for example fractional distillation utilizing at least one fractionation distillation column, or any fractionation carried out as evaporation, distillation, extraction or as a combination of any of these. Optionally part of the light fraction is upgraded by hydroprocessing to obtain inter alia drop-in fuels such as diesel, naphtha, and jet-fuel and optionally part of the light fraction is used as solvent in the thermal upgrading step of the process thus avoiding the formation of coke and undesired polymerization reactions. The product of the further thermal conversion treatment may be directed to a hydroprocessing step without fractionation. The hydroprocessing may be carried out for effecting at least one of hydrodeoxygenation, hydrodewaxing, hydroisomerization, hydrocracking, hydrodearomatization and ring opening reactions.

EXAMPLES

The pinewood composition used in the examples is shown in Table 1 and the black liquor used in the examples is shown in Table 2.

TABLE 1

| Pinewood (sawdust) composition Pine wood | |
|---|---|
| Wood chips (wt. %) $d_p$ < 50 mm | 100 |
| Sawdust, sieve fraction (wt. %) | |
| 500 > $d_p$ > 250 μm | 61.6 |
| 250 > $d_p$ > 150 μm | 13.7 |
| 150 > $d_p$ > 53 μm | 16.9 |
| $d_p$ < 50 μm | 7.7 |
| Moisture content of wood chips (wt. %) | 12 |
| Moisture content of sieved fraction (wt. %) | 3.6 |
| Fixed carbon (wt. %) | 24.1 |
| Volatiles (wt. %) | 72.8 |
| Elemental composition (wt. %) | |
| C | 48.3 |
| H | 6.4 |
| N | 0.1 |
| O* | 45.2 |
| AAEM (ppm) | |
| Na | 30 |
| K | 370 |
| Mg | 160 |
| Ca | 2225 |
| Si | 200 |
| Fe | 40 |
| Al | 20 |
| Zn | 20 |
| Sum (AAEM) | 3065 |
| Total ash (520° C.) pine wood, (wt. %) | 0.30 |
| Total ash (815° C.) pine wood, (wt. %) | 0.21 |

*Oxygen by difference

TABLE 2

| Black liquor composition | |
| --- | --- |
| Water | 57.14 wt. % |
| Organics | 19.18 wt. % |
| Inorganics | 23.68 wt. % |

For the black liquor composition water was determined by Karl Fischer titration, inorganics were measured by ashing and organics were calculated by 100–water %–ash %. Dry Black Liquor includes organics and inorganics.

Analysis Methods Used in the Examples

Gas samples were analysed with an off-line Varian rapid gas chromatograph RGA-450GC with two analytical columns (10 m Molsieve 5 A and 10 m PPQ), and with an off-line Agilent 7890A gas chromatograph equipped with three analytical columns and three different detectors (0.9 m Supelco 12255 U column and TCD detector for the quantification of $CO_2$ and $H_2S$, 10 m DB1 column and FID detector for the quantification of light hydrocarbons and, 10 m Moisieve 5 A column and TCD detector for the quantification of $O_2$, $H_2$, $N_2$ and CO) using helium as carrier gas in all cases.

The molecular weight distribution of the oil phase was determined with a Gel Permeation Chromatograph (GPC) of the Agilent 1200 series, applying IR and UV light (wavelength 254 nm) and 3 GPC PLgel 3 lm MIXED-E columns placed in series. The columns were operated at 40° C. and tetrahydrofuran (THF) was used as a solvent. Calibration was performed with a solution of polystyrene with molecular weights ranging from 162 to 30230 Da.

The elemental composition of the liquid and char was determined with an Interscience Flash 2000 elemental analyser. The water content of the aqueous phase was determined by Karl Fischer titrations using Hydranal composite 5, Metrohm 787 KFTitrino as titrant.

The pH of the aqueous phase, obtained after the experiments, was measured with a Metrohm 785 DMP titrino apparatus.

The contents of ash, volatile matter, moisture and fixed carbon in the pinewood (proximate analysis) were determined by measuring weight loss upon heating. These constituents will add up to 100%. Ash content determination was performed by heating a pinewood sample in air at a slow heating rate (5° C./min). Once the temperature reached 520 or 815° C. it was kept constant for 6 hours before the sample was weighted. The remaining weights measured at 520 and 815° C. represent the ash contents at these temperatures.

The combined content of fixed carbon and volatiles was determined by slowly heating a pinewood sample (5° C./min) in nitrogen to 950° C. where it was maintained for 10 minutes before it was weighted. The measured weight loss represents the combined content of water and volatiles. The remaining weight represents the content of fixed carbon.

The moisture content of the pinewood was determined by a PMB-53 moisture analyzer of Adam Equipment.

Calculations of Mass Balance and Yields

The mass balance distinguishes four different product phases—oil (o), aqueous phase (aq), gas (g) and solids (s), i.e. char.

The produced amounts of each phase are determined as follows:

1. Oil—The amount of organics remaining in the recovered oily phase and corrected by subtracting the known water content in the oil obtained by Karl Fischer titration
2. Aqueous phase organics (water soluble organics—WSO)—Based on measured water content of the ingoing (the recycle) and outgoing aqueous phase using Karl Fischer titration (the concentration of organics is determined by difference (100–wt. % water) and the black liquor fed (assuming that the organics in BL are WSO). The yield of WSO was determined by: (gram_WSO_in_aqu_out–gram_WSO_in_aqua_in)/gram_wood/bark_in. WSO_in contains the recycle WSO and the organics in black liquor.
3. Gas—From the known volume of produced gas and GC composition, the weight of total gas is calculated and the amount of measured $N_2$ is subtracted. In case $K_2CO_3$ is used as a salt, the possible contribution of formed $CO_2$ to the amount of gas is neglected. In case of experiments with black liquor, the known volume of produced gas and the average molar weight of 33 g/mol are used to estimate the amount of gas produced. Nitrogen is subtracted based on the initial pressure and the approximate initial volume taken up by gas phase in the reactor at the start of an experiment.
4. Solids (char)—The amount of solids is determined directly by weighing dried solids when withdrawn from the oven.

Since all yields are given on dry biomass basis, the amount of dry biomass fed in the autoclave is corrected for initial wood moisture as follows:

$$m_{biomass,dry} = m_{biomass} \cdot (1 - w_{moisture,biomass}) \quad \text{(Eq.1)}$$

The yields are calculated by:

$$Y_{product} = \frac{m_{product}}{m_{biomass,dry}} \quad \text{(Eq. 2)}$$

$Y_O$ is used for the oil yield, $Y_{AQ}$ for the aqueous phase organics, $Y_S$ for the solids and $Y_G$ for the gas. Subsequently, the balance closure is expressed as the sum of all four product yields.

For tests with black liquor, biomass in the denominator includes the organics in black liquor.

Vacuum Residue and Average Molecular Weight

Both vacuum residue (VR) and average molecular weight ($M_w$) are excerpted from GPC analysis. The parameters are based on the results from the refractive index detector (RID) of the GPC analyser. Molecular weight is taken directly from the GPC output file, whereas vacuum residue is calculated as follows:

$$VR = \frac{\text{Area of molecules heavier than 1000 } Da}{\text{Total Area}} \quad \text{(Eq. 3)}$$

The areas are calculated using numerical integration (trapezoidal method).

$$\text{Area} = \int_{\log M_{w,1}}^{\log M_{w,2}} RID \, d(\log M_w) \quad \text{(Eq.4)}$$

Oxygen Content

With the applied recovery procedure, a small fraction of water always remained in the oil phase. Therefore, the oxygen content is corrected for the oxygen in water. The water content of the oil sample ($KFT_{oil}$ in wt. %) is known from Karl Fischer titration and therefore the obtained oxygen content including that of water ($O_{wet}$) can be corrected to obtain the oxygen content of the oil on dry basis (O):

$$O = \frac{O_{wet} - \frac{16}{18} \cdot KFT_{oil}}{\left(1 - \frac{KFT_{oil}}{100}\right)} \quad \text{(Eq. 5)}$$

The same procedure holds for the hydrogen content in the oil:

$$H = \frac{H_{wet} - \frac{2}{18} \cdot KFT_{oil}}{\left(1 - \frac{KFT_{oil}}{100}\right)} \quad \text{(Eq. 6)}$$

Example 1

Wood in the form of sawdust (15 wt. %) was mixed with water and salts shown in Table 3. Thereafter the mix was treated in hydrothermal liquefaction. The reactor temperature was 400° C. and the reaction time 10 minutes (at set-point). The pressure was maximally 350 bar.

The product yields for char and oil are presented in Table 3.

TABLE 3

Amounts of salts used, pH of aqueous phase and product yields

| Salt (wt. % of total mixture) | pH aqueous phase | Yo [wt. %, dry] | Ys [wt. %, dry] | Yg [wt. %, dry] |
|---|---|---|---|---|
| 1.5% NaOH and 1.5% K$_2$CO$_3$ | 8.6 | 40.5 | 7.8 | 30.9 |
| 1.5% K2CO3 | 7.9 | 39.7 | 8.7 | 33.2 |
| 1.5% K2CO3 | 7.6 | 41.4 | 7.7 | 34.5 |
| 0.5% NaOH | 5.2 | 39.6 | 8.5 | 31.1 |
| 1.5% NaOH | 7.6 | 35.6 | 9.3 | 25.4 |
| 0.75% NaOH | 6.8 | 33.8 | 8.6 | 21.2 |
| 0.5% NaOH | 5.4 | 32.7 | 7 | 25.9 |
| 1.5% NaOH | 7.9 | 34.7 | 8.6 | 23.6 |
| 1.5% NaOH | 7.9 | 32.2 | 9.3 | 29.9 |
| buffer NaOH + HAc (pH 4.94) | 4.4 | 36.8 | 10.5 | 12.6 |
| buffer NaOH + HAc (pH 4.94) | 4.4 | 38.1 | 10.2 | 15.0 |
| buffer NaOH + HAc (pH 5.49) | 4.6 | 42.3 | 10.4 | 14.4 |
| buffer NaOH + HAc (pH 6.07) | 4.6 | 39.1 | 10.3 | 14.7 |
| buffer NaOH + HAc (pH 5.64) | 4.6 | 36.8 | 9.7 | 15.6 |
| none | 2.9 | 35.7 | 18.3 | 23.2 |
| none | 2.7 | 38.2 | 19.1 | 22.8 |
| none | 3.2 | 33.1 | 23.2 | 19.7 |
| 4 ppm acetic acid | 3.3 | 28.3 | 22.5 | 18.7 |
| 1 ppm acetic acid | 3.1 | 32 | 22.6 | 19.9 |

Figure 2:
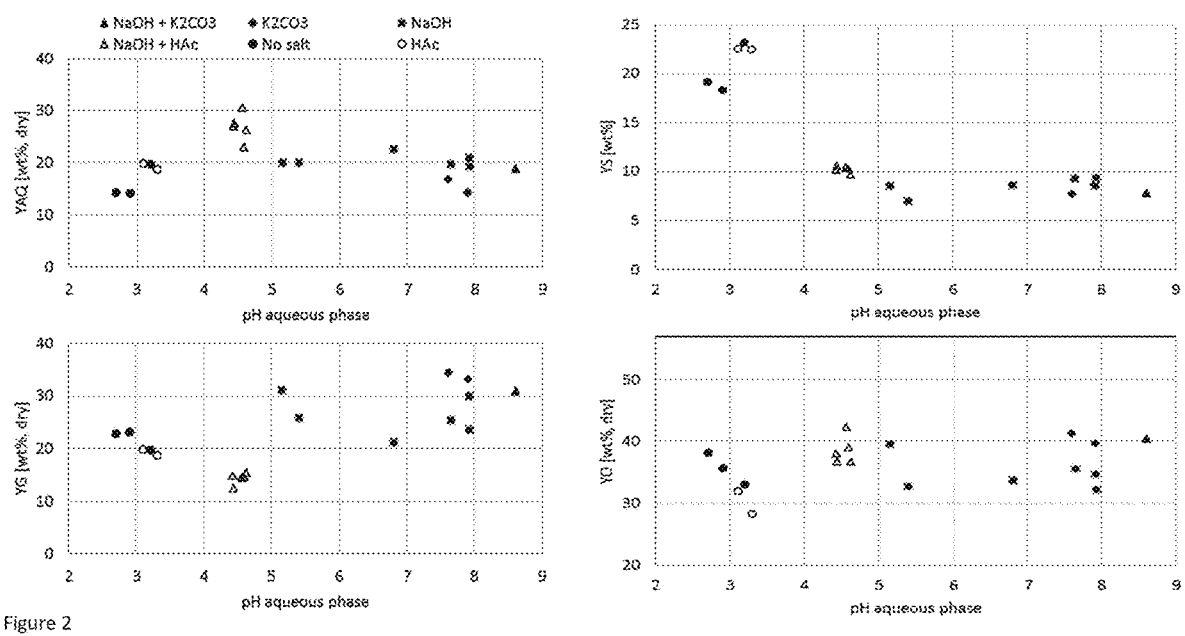
FIG. 2 shows the results of the tests of Example 1.
Figure 3:
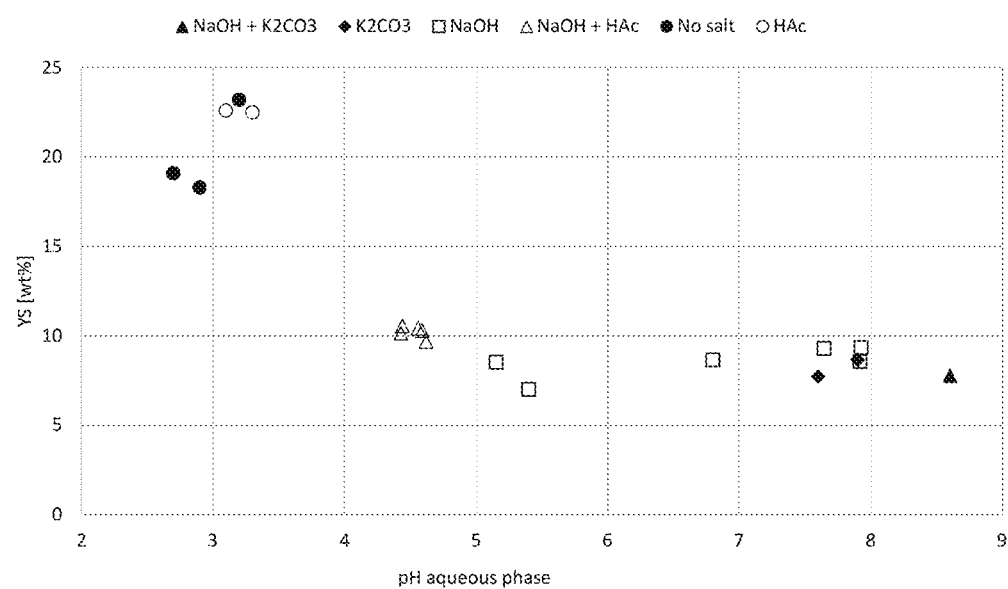
FIG. 3 shows the results of the tests of Example 1.

As can be seen from Table 3 and FIGS. 2 and 3, the pH of the aqueous phase was 2.7-3.2 if no alkaline salts were added ("no salts"). Adding alkaline salts neutralized the acids and an addition of 0.5 wt. % NaOH on dry biomass basis was sufficient for increasing pH of the hydrothermal liquefaction product aqueous phase to ~pH 5. Independently of the salt(s) used, above about pH 5, the products slate did not change anymore as a function of pH. For pH above 4.4 a low yield of char between 7-10.5 wt. % was obtained compared to the char yield for pH below 3.3 which was between 18.3 and 23.2 wt. %. As can be seen, the oil yield was not significantly affected by the pH. The lower yields of char correspond to higher gas yields.

Example 2

Wood in the form of sawdust (15 wt. %) was mixed with recycled hydrothermal liquefaction product aqueous phase and NaOH. The amount of added salt was adjusted to maintain hydrothermal liquefaction product aqueous phase pH~5. The mix comprising the lignocellulosic feedstock, i.e. sawdust was then treated in hydrothermal liquefaction. The reactor temperature was 400° C. and the reaction time 10 minutes (at set-point). The pressure was maximally 350 bar.

The amounts of salts added as well as the pH of the feed, i.e. the mix comprising the lignocellulosic feedstock and the hydrothermal liquefaction product aqueous phase (AQ) are shown in Table 4. The product oil yields are shown in Table 5. As can be seen, after recycling over four times, smaller amounts of alkaline salts are needed, about 2 wt. % on dry ash free wood intake basis.

TABLE 4

Conditioning of aqueous phase in recycle experiments

| Run # | wt. % salts added [daf]* | pH feed | pH AQ |
|---|---|---|---|
| 1 | 0.00 | 7.00 | 3.19 |
| 2 | 3.64 | 5.40 | 4.50 |
| 3 | 3.40 | 5.51 | 4.80 |
| 4 | 3.49 | 6.16 | 4.96 |
| 5 | 1.78 | 5.29 | 5.01 |
| 6 | 2.16 | 5.27 | 4.90 |

TABLE 5

Oil yields and oil quality

| Run # | Oil yield [wt. % daaf] | Yo, c [wt. % C] | Oxygen [wt. % dry] | Molar weight [g/mol] | VR [Area %] |
|---|---|---|---|---|---|
| 1 | 27.41 | 36.7 | 16.4 | 605 | 15.7 |
| 2 | 36.22 | 49.0 | 15.1 | 615 | 16.2 |
| 3 | 35.32 | 48.5 | 14.1 | 596 | 16.3 |
| 4 | 36.57 | 48.8 | 16.2 | 579 | 15.8 |
| 5 | 38.01 | 51.3 | 15.7 | 588 | 15.2 |
| 6 | 36.43 | 49.0 | 17.6 | 543 | 14.0 |

$Y_{O, C}$ = yield on carbon basis

Figure 4:
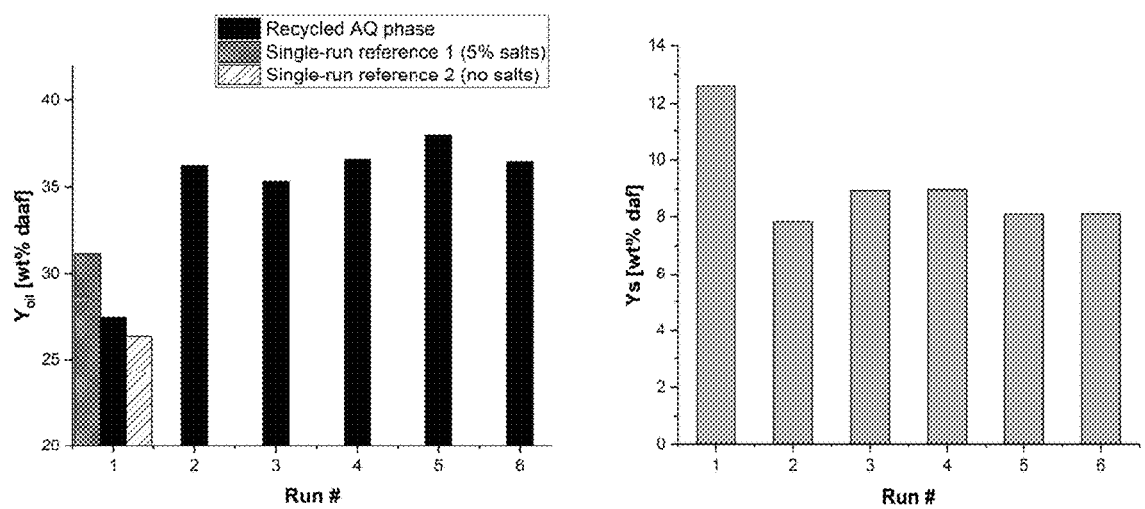
FIG. 4 shows the results of the tests of Example 2.
Figure 5:
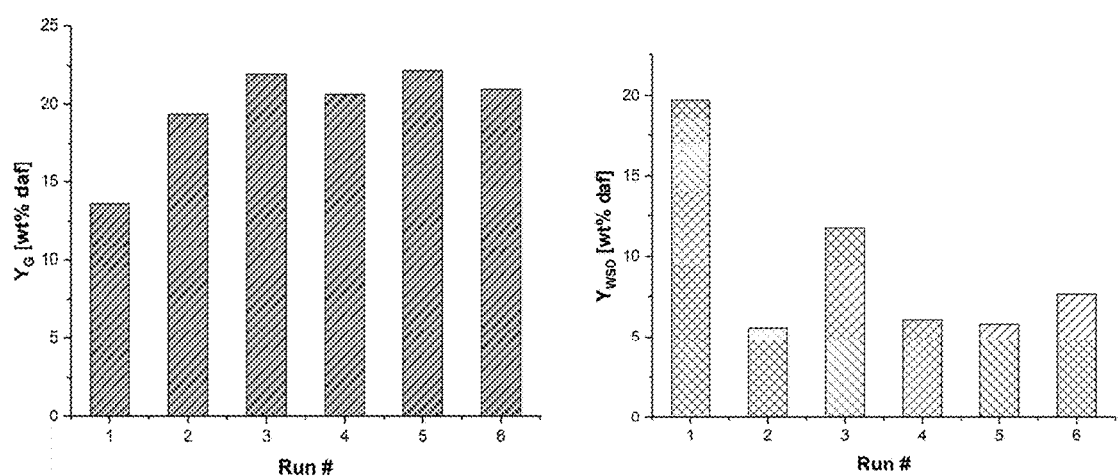
FIG. 5 shows the results of the tests of Example 2.

As can be seen from FIG. 4, the yield of char and the oil yield stabilizes to a lower yield of char and a higher oil yield level from the second run on. From the second run on, the oil yield is remarkably higher than for the single-run reference 1 with 5 wt. % salt addition and the single-run reference 2 without salts addition. The gas yields and yield of water soluble organics are shown in FIG. 5.

Table 6 shows a comparison of the recycles of Run #1 and Run #6. As can be seen, more oil and gas and less char and water soluble organics are produced when recycling the aqueous phase. Recycling of the aqueous phase leads to more oil with a steady quality, to a decreased extent of charring, i.e. a lower yield of char. The extra CO2 formation leads to further deoxygenation. The decreased yield of water soluble organics leads to a buffering effect and a decrease in salts consumption.

TABLE 6

Comparison of yields of recycled aqueous phase run #1 and run #6

| Yields [wt. % daaf] | Run #1 | Run #6 |
|---|---|---|
| Oil | 27.4 | 36.4 |
| Char | 12.6 | 8.1 |

TABLE 6-continued

Comparison of yields of recycled aqueous phase run #1 and run #6

| Yields<br>[wt. % daaf] | Run #1 | Run #6 |
|---|---|---|
| Gas | 13.6 | 20.9 |
| WSOs | 19.7 | 7.7 |

Example 3

3 g of sawdust (15 wt. %) was mixed with black liquor and water. The amount of black liquor was varied. The mix comprising sawdust was then treated in hydrothermal liquefaction. The reactor temperature was 300° C. and the reaction time 20 minutes (at set-point). The pressure was maximally 110 bar.

Figure 6:
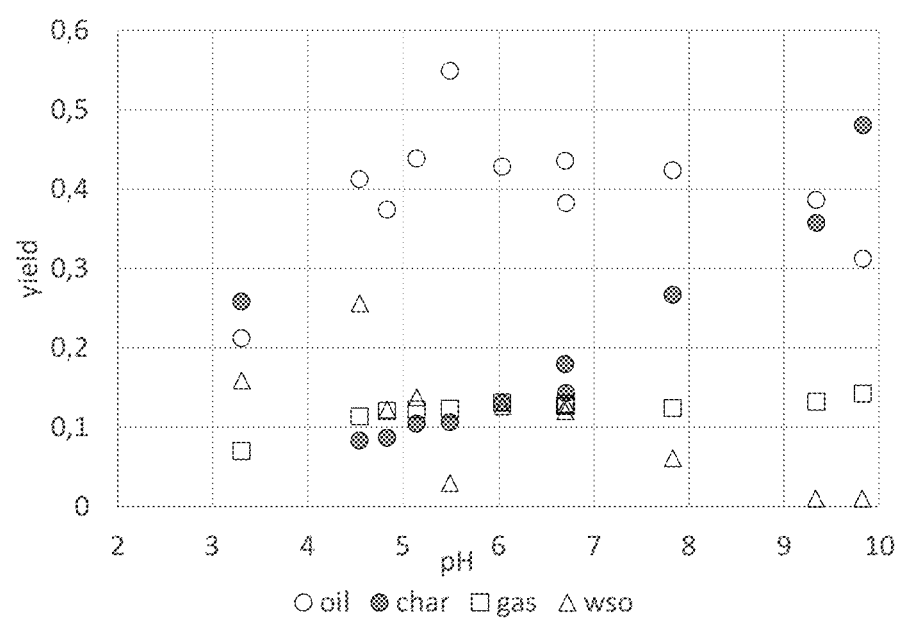
FIG. 6 shows the results of the tests of Example 3.

As can be seen from FIG. 6, the oil yield is almost constant in range 4.5-9 pH although the amount of black liquor is varied. The yield of solids (char) is constantly low at pH 4.5-6 and has a higher yield for pH below pH 4.5 and above pH 6. The amount of char increases significantly above pH 7-8. At the same time, at pH higher than 7 the yield of water soluble organics decreases.

Example 4

Wood in the form of sawdust (15 wt. %) was mixed with recycled hydrothermal liquefaction product aqueous phase and black liquor. The amount of added black liquor was adjusted to maintain a constant wood to black liquor ratio. The mix comprising the lignocellulosic feedstock, i.e. sawdust was then treated in hydrothermal liquefaction. The reactor temperature was 300° C. and the reaction time 20 minutes (at set-point). The pressure was maximally 110 bar.

TABLE 7

Product yields for constant wood:BL ratio

| Dry wood:dry BL | Oil yield (wt. %) | Char yield wt. % | Gas yield wt. % | WSO yield wt. % | pH AQ |
|---|---|---|---|---|---|
| 2.0 | 46 | 16 | 12 | 18 | 6.61 |
| 2.1 | 37 | 29 | 15 | 9 | 6.92 |
| 2.0 | 45 | 32 | 15 | 10 | 7.33 |
| 2.0 | 33 | 41 | 15 | 17 | 7.97 |
| 2.0 | 31 | 30 | 16 | 17 | 7.32 |

Example 5

Wood in the form of sawdust (15 wt. %) was mixed with recycled hydrothermal liquefaction product aqueous phase and black liquor. The amount of added black liquor was adjusted to maintain hydrothermal liquefaction product aqueous phase pH~5. The mix comprising the lignocellulosic feedstock, i.e. sawdust was then treated in hydrothermal liquefaction. The reactor temperature was 300° C. and the reaction time 20 minutes (at set-point). The pressure was maximally 110 bar.

As can be seen from Table 8, both the oil yield as well as the char yield seems to decrease with increasing recycles when the pH is kept constant. A wood to black liquor ratio of 6 results in pH~5. Due to the alkalinity and buffer effect of the aqueous phase less black liquor is needed to reach the same pH when the aqueous phase is recycled.

TABLE 8

Product yields for constant pH 5

| Dry bio:dry BL | Oil yield (wt. %) | Char yield (wt. %) | pH AQ |
|---|---|---|---|
| 6 | 43 | 10 | 4.65 |
| 12 | 42 | 11 | 4.48 |
| 5 | 44 | 13 | 4.90 |
| 6 | 42 | 14 | 5.00 |
| 6 | 39 | 17 | 5.15 |
| 7 | 38 | 18 | 5.18 |
| 6 | 39 | 18 | 5.20 |

The invention claimed is:

1. A method for controlling product slate of hydrothermal liquefaction characterized in that the method comprises
    separating (120) an aqueous phase (53) and an oil phase (50) of a hydrothermal liquefaction product,
    adjusting pH of the hydrothermal liquefaction product aqueous phase,
    measuring pH of the hydrothermal liquefaction product aqueous phase, and
    thermally converting the oil phase (50).

2. The method according to claim 1, characterized in that the method comprises adjusting acidity of a mix comprising lignocellulosic feedstock by adding acids, alkalis and/or buffers under aqueous conditions; and subjecting the mix comprising lignocellulosic feedstock to hydrothermal liquefaction.

3. The method according to claim 2, characterized in that adding acids, alkalis or buffers comprises adding black liquor; black liquor and water; acid salts; alkaline salts; acidic solution; alkaline solution; alkaline aqueous solution; buffers; buffer solution; $CO_2$; recirculated hydrothermal liquefaction product aqueous phase; or a mixture of any of these.

4. The method according to claim 3, characterized in that the recirculated hydrothermal liquefaction product aqueous phase comprises recycled salts originating from black liquor; and/or from recycled acid salts or alkaline salts; and/or from recycled alkaline salts.

5. The method according to claim 3, characterized in that the alkaline aqueous solution is black liquor; black liquor and water; recirculated hydrothermal liquefaction product aqueous phase comprising recycled salts originating from black liquor; or a mixture of any of these.

6. The method according to claim 1, characterized in that a dry biomass to dry black liquor ratio is between 0.5 and 7.

7. The method according to claim 1, characterized in that the pH of the hydrothermal liquefaction product aqueous phase is at least pH 3.5.

8. The method according to claim 1, characterized in that controlling product slate comprises controlling formation of oil phase (wt. %), char (wt. %) or a combination thereof versus 100 wt. % hydrothermal liquefaction product.

9. The method according to claim 1, characterized in that the method comprises a process comprising the following steps
    (a) heating during hydrothermal liquefaction (110) a mix (30) comprising lignocellulosic feedstock (10) at a temperature between 290° C. and 450° C., under a pressure from 90 to 350 bar, to obtain the hydrothermal liquefaction product (40); and
    (b) optionally separating gas (51) and/or char (52) of the hydrothermal liquefaction product (40) of step (a).

10. The method according to claim 9, characterized in that the process further comprises a pretreatment comprising treating the mix (30) comprising lignocellulosic feedstock (10) at a temperature between 180° C. and 245° C., under a pressure from 10 to 55 bar, for 10-180 min before heating the mixture according to step (a).

11. The method according to claim 9, characterized in that the one or more of acid, alkali and buffer (20) is added to the mix comprising lignocellulosic feedstock before heating the mix according to step (a) or before the pretreatment.

12. The method according to claim 9, characterized in that the process further comprises recirculating at least part of the hydrothermal liquefaction product aqueous phase to the mix comprising lignocellulosic feedstock (10); to the pretreatment step; and/or to a hydrothermal treatment step according to step (a).

13. The method according to claim 9, characterized in that lignocellulosic feedstock (10) is energy crops, waste or residues of wood-processing, residues of the pulp- and papermaking, and/or residues of timber processes.

14. The method according to according to claim 2, characterized in that adding acids, alkalis or buffers comprises adding black liquor; alkaline salts chosen from one or more of NaOH, $K_2CO_3$, KOH and $Na_2CO_3$; recirculated hydrothermal liquefaction product aqueous phase; or a mixture of any of these.

15. The method according to claim 4, characterized in that the recirculated hydrothermal liquefaction product aqueous phase comprises recycled acid salts or alkaline salts originating from black liquor.

16. The method according to claim 15, wherein the recycled alkaline salts are chosen from one or more of NaOH, $K_2CO_3$, KOH and $Na_2CO_3$.

17. The method according to claim 1, characterized in that a dry biomass to dry black liquor ratio is between 0.5 and 6.

18. The method according to claim 1, characterized in that a dry biomass to dry black liquor ratio is between 0.5 and 2.5.

19. The method according to claim 1, characterized in that the pH of the hydrothermal liquefaction product aqueous phase is between pH 4 and pH 10.

20. The method according to claim 1, characterized in that the pH of the hydrothermal liquefaction product aqueous phase is between pH 4.5 and pH 6.

21. The method according to claim 1, characterized in that the thermal conversion step is a thermal upgrading comprising heating the oil phase of step (b) and solvent at a temperature between 360° C. and 450° C. under a pressure from 50 to 120 bar.

22. The method according to claim 21, characterized in that the solvent is crude tall oil, acid oil, vegetable oil, renewable hydrocarbons, or mixtures thereof.

23. The method according to claim 9, characterized in that the lignocellulosic feedstock is seeds, residues of wood processing, or a combination thereof.

24. The method according to claim 9, characterized in that the lignocellulosic feedstock is seed crop, slash, urban wood waste, lumber waste, wood chips, wood branches, bark, wood sawdust, straw, firewood, plywood residual, or a combination thereof.

25. The method according to claim 9, characterized in that the lignocellulosic feedstock is *Brassica carinata* seed, wood chips, bark, sawdust, or a combination thereof.

* * * * *